US010818171B2

(12) United States Patent
Agarwal et al.

(10) Patent No.: US 10,818,171 B2
(45) Date of Patent: Oct. 27, 2020

(54) VIRTUAL BARRIER SYSTEM

(71) Applicant: APTIV TECHNOLOGIES LIMITED, St. Michael (BB)

(72) Inventors: Divya Agarwal, Sunnyvale, CA (US); Brian R. Hilnbrand, Mountain View, CA (US); Michael H. Laur, Mission Viejo, CA (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 16/290,552

(22) Filed: Mar. 1, 2019

(65) Prior Publication Data

US 2019/0197891 A1 Jun. 27, 2019

Related U.S. Application Data

(63) Continuation of application No. 15/840,112, filed on Dec. 13, 2017, now Pat. No. 10,223,912.

(60) Provisional application No. 62/589,000, filed on Nov. 21, 2017.

(51) Int. Cl.
| | |
|---|---|
| *G08G 1/16* | (2006.01) |
| *G08G 1/09* | (2006.01) |
| *G08G 1/0965* | (2006.01) |
| *G08G 1/0967* | (2006.01) |
| *H04W 4/021* | (2018.01) |
| *G08G 1/00* | (2006.01) |
| *B60W 50/00* | (2006.01) |

(52) U.S. Cl.
CPC .......... *G08G 1/091* (2013.01); *G08G 1/0965* (2013.01); *G08G 1/096783* (2013.01); *G08G 1/096791* (2013.01); *G08G 1/16* (2013.01); *G08G 1/161* (2013.01); *G08G 1/162* (2013.01); *G08G 1/166* (2013.01); *G08G 1/207* (2013.01); *H04W 4/021* (2013.01); *B60W 2050/008* (2013.01); *B60W 2050/0077* (2013.01); *B60W 2050/0078* (2013.01); *G08G 1/165* (2013.01)

(58) Field of Classification Search
CPC ................. G08G 1/091; G08G 1/0965; G08G 1/096791; G08G 1/16; G08G 1/161; G08G 1/165; G08G 1/166; B60W 2050/0077; B60W 2050/0078; B60W 2050/008

See application file for complete search history.

(56) References Cited

U.S. PATENT DOCUMENTS

| | | | |
|---|---|---|---|
| 9,928,744 B1* | 3/2018 | Tannenbaum | ... G08G 1/096791 |
| 2002/0175825 A1* | 11/2002 | Clerk | ..................... B66F 17/003 340/686.6 |
| 2003/0090392 A1* | 5/2003 | Schuessler | ........... G08G 1/0965 340/988 |

(Continued)

*Primary Examiner* — Andrew W Bee
(74) *Attorney, Agent, or Firm* — Dentons US LLP

(57) ABSTRACT

A virtual-barrier system that defines a keep-out-zone for vehicles to avoid includes a transmitter, a location-detector, and a controller. The transmitter is configured to broadcast information regarding a keep-out-zone. The location-detector is configured to indicate a location of the transmitter. The controller is in communication with the transmitter and the location-detector. The controller is configured to determine boundaries of the keep-out-zone in accordance with the location, and operate the transmitter to broadcast coordinates of the boundaries of the keep-out-zone.

15 Claims, 4 Drawing Sheets

(56) References Cited

U.S. PATENT DOCUMENTS

| | | | |
|---|---|---|---|
| 2005/0221759 A1* | 10/2005 | Spadafora | G08G 1/09 |
| | | | 455/41.2 |
| 2006/0114123 A1* | 6/2006 | Eckstein | G08G 1/161 |
| | | | 340/903 |
| 2012/0025964 A1* | 2/2012 | Beggs | B60Q 1/2673 |
| | | | 340/435 |
| 2014/0063232 A1* | 3/2014 | Fairfield | B60T 7/18 |
| | | | 348/118 |
| 2016/0304028 A1* | 10/2016 | Hathaway | G08G 1/04 |
| 2017/0242436 A1* | 8/2017 | Creusot | G08G 1/096816 |
| 2017/0274898 A1* | 9/2017 | Nakamura | B60W 30/18163 |
| 2018/0025637 A1* | 1/2018 | Dotzler | G08G 1/096775 |
| | | | 340/905 |
| 2018/0157264 A1* | 6/2018 | Isaacs | G08G 1/00 |
| 2018/0335781 A1* | 11/2018 | Chase | G05D 1/028 |
| 2019/0019413 A1* | 1/2019 | Yun | B60W 30/12 |
| 2019/0333392 A1* | 10/2019 | Schwensfeier | G08G 1/096716 |

\* cited by examiner

VIRTUAL BARRIER SYSTEM

CROSS-REFERENCE TO RELATED APPLICATIONS

This application is a continuation of U.S. patent application Ser. No. 15/840,112, titled "VIRTUAL BARRIER SYSTEM," filed on Dec. 13, 2017, which claims the benefit of priority of U.S. Provisional Patent Application No. 62/589,000, titled "VIRTUAL BARRIER SYSTEM," filed on Nov. 21, 2017, the contents of which are incorporated herein by reference for all purposes.

TECHNICAL FIELD OF INVENTION

This disclosure generally relates to establishing a keep-out-zone for vehicles to avoid driving through or in, and more particularly relates to a way to communicate or broadcast the location or coordinates of the boundaries of the keep-out-zone.

BRIEF DESCRIPTION OF DRAWINGS

The present invention will now be described, by way of example with reference to the accompanying drawings, in which.

DETAILED DESCRIPTION

Figure 1:
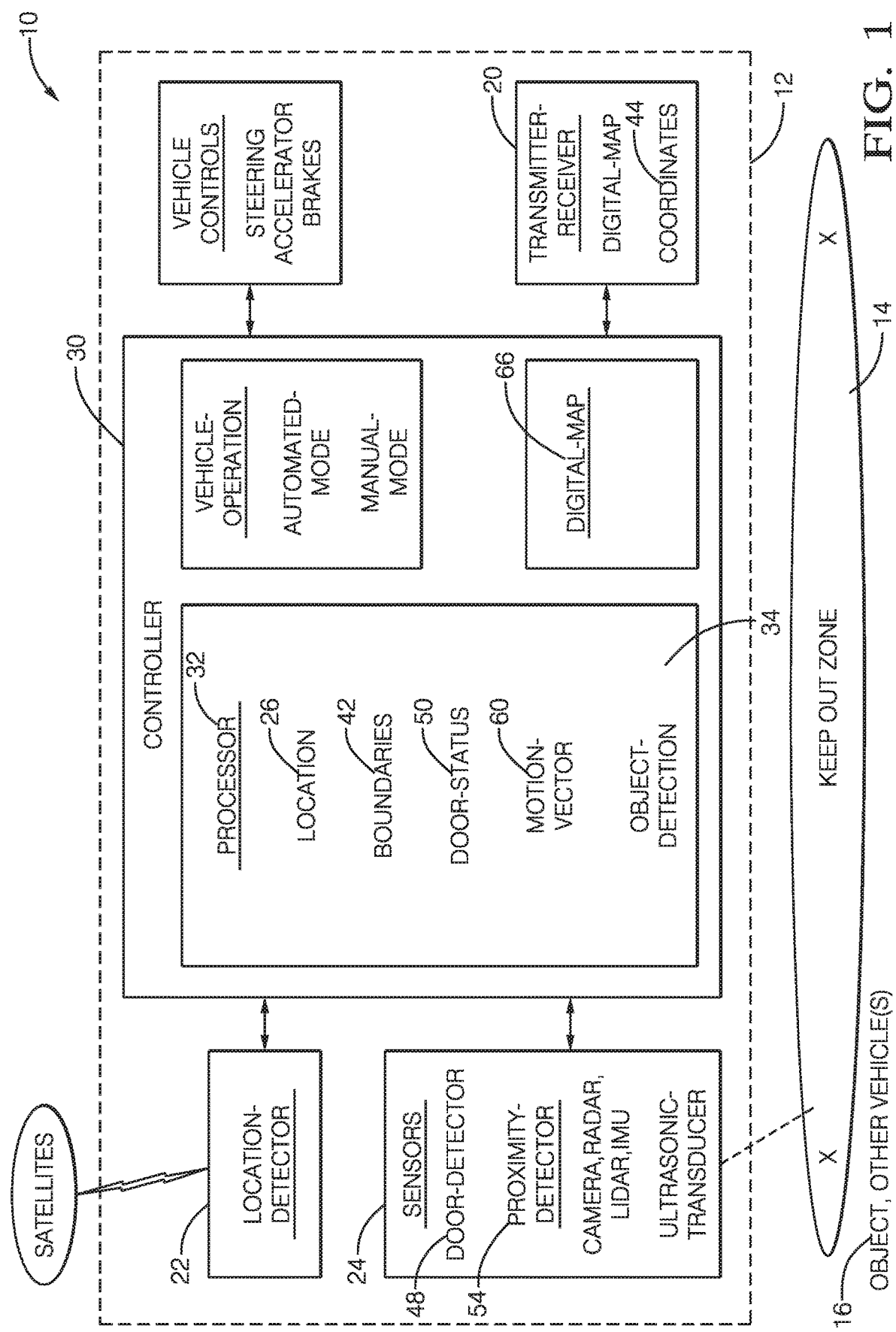
FIG. 1 is a diagram of a virtual barrier system in accordance with one embodiment.

FIG. 1 illustrates a non-limiting example of a virtual-barrier system 10, hereafter referred to as the system 10, that communicates or broadcasts the presence or establishment of a keep-out-zone 14 to other-vehicles 16 (FIGS. 2 and 3) so the instances of the other-vehicles 16 can avoid driving in or driving through the keep-out-zone 14 that may be established to protect, for example, a host-vehicle 12 stopped alongside a roadway, or equipment and persons in a construction-zone. That is, the system 10 defines the keep-out-zone 14 as an area where the other-vehicles 16 are supposed to avoid operating or driving. Avoiding the keep-out-zone 14 may involve the other-vehicles 16 steering around the keep-out-zone 14, changing a previously planned route to follow a different route and thereby totally avoid coming near the keep-out-zone 14, or stopping and waiting if necessary.

In some examples or non-limiting embodiments of the system 10 described herein, the host-vehicle 12 and/or one or more instances of the other-vehicles 16 may be characterized as an automated vehicle. As used herein, the term automated vehicle may apply to instances when the host-vehicle 12 and/or one or more instances of the other-vehicles 16 are being operated in an automated-mode, i.e. a fully autonomous mode, where a human-operator (not shown) of the host-vehicle 12 or other-vehicles 16 does little more than designate a destination to operate the host-vehicle 12 or other-vehicles 16. However, full automation is not a requirement. It is contemplated that the teachings presented herein are useful when the host-vehicle 12 or other-vehicles 16 are operated in a manual-mode where the degree or level of automation may be little more than providing an audible or visual warning/guidance to the human-operator who is generally in control of the steering, accelerator, and brakes of the host-vehicle 12 or other-vehicles 16.

The system 10 includes a transmitter 20 that may be part of a transceiver that those in the art would recognize also includes a receiver. The transmitter 20 may be part of part of a dedicated short range communications (DSRC) transceiver, an internet transceiver that communicates over a cellular-phone network, a satellite-network, or a Wi-Fi network transceiver. The transmitter 20 may be located on the host-vehicle 12, or be part of infrastructure, e.g. permanent infrastructure such traffic-camera or portable/temporary infrastructure such as construction barrier, a temporary road-cone, or an emergency 'flare' deployed by a police officer at an accident site. The transmitter 20 is configured to broadcast information regarding the keep-out-zone 14 that may be an area normally used for travel by vehicles, but now should be avoided for various reasons, e.g. an accident-site or a construction-site. The information may be communicated by direct broadcast of information via DSRC, or communicated as traffic-information to store in the cloud which is subsequently broadcast via internet or satellite, or communicated as an update to a digital-map stored in the cloud and accessed via an internet connection.

The system 10 includes a location-detector 22 such as a global-positioning-system (GPS) that typically indicates latitude, longitude, and elevation, i.e. a world-coordinate based location. Alternatively, the location-detector 22 may use sensors 24 such as a camera, radar, lidar, ultrasonic-transducer, or any combination thereof to determine a relative-position to a reference-object (not shown) that has a known reference-coordinate that is indicated or documented in surveyed information that provides an identification of the object. Identification of the object can be from beacon information identifying the object for correlation with a specific sensor on the host-vehicle 12. This identification would allow a relative boundary to be established without knowing the exact location in GPS coordinates of the host-vehicle 12. As will become apparent in the description that follows, the location of the location-detector 22 is not necessarily the same as the location 26 of the transmitter 20. That is, there may need to apply an offset-distance and an offset-direction to the information from the location-detector 22 to indicate or determine the location 26 of the transmitter 20. The determination of the offset-distance and the offset-direction would likely be determined each time the keep-out-zone 14 is established or defined.

The system 10 includes a controller 30 configured to communicate with at least the transmitter 20 and the location-detector 22. Communication between the controller 30, the transmitter 20, and the location-detector 22 may be by way of wires, wireless communication, e.g. radio-frequency (RF) or infrared (IR), or optical-cable as will be recognized by those in the art. The controller 30 may include a processor 32 such as a microprocessor or other control circuitry such as analog and/or digital control circuitry including an application specific integrated circuit (ASIC) for processing data as should be evident to those in the art. The controller 30 may include memory 34, i.e. non-transitory computer-readable storage medium, including non-volatile memory, such as electrically erasable programmable read-only memory (EEPROM) for storing one or more routines, thresholds, and captured data. The memory 34 may be part of the processor 32, or part of the controller 30, or separate from the controller 30 such as remote memory stored in the cloud. The one or more routines may be executed by the controller 30 or the processor 32 to perform steps for determining the location 26 based on signals received by the controller 30 from the location-detector 22 and/or the sensors 24 as described herein.

Figure 2:
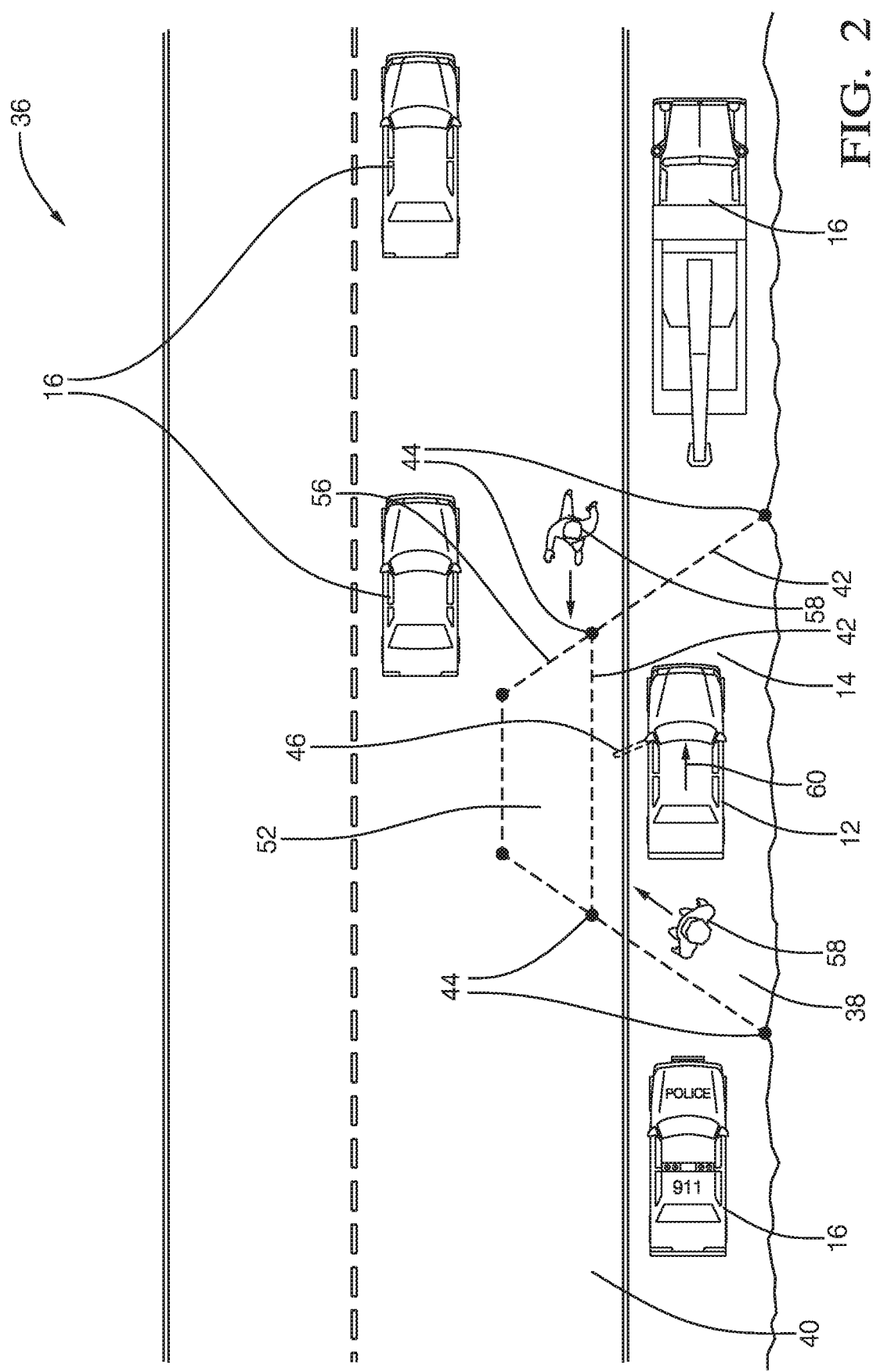
FIG. 2 is a first-scenario encountered by the system of FIG. 1 in accordance with one embodiment.

FIG. 2 illustrates a non-limiting example of a first-scenario 36 that may be encountered by the system 10. In this example, the host-vehicle 12 is stopped on a shoulder 38 of a roadway 40 because, for example, the host-vehicle 12 has suffered a mechanical failure. The controller 30 (FIG. 1) or the processor 32 is configured to determine boundaries 42 of the keep-out-zone 14 in accordance with (i.e. based on) the location 26, and operate the transmitter 20 to broadcast instances of coordinates 44 of the boundaries 42 of the keep-out-zone 14. That is, the system 10 defines an area around, for example, the host-vehicle 12 as the keep-out-zone 14 that one or more instances of the other-vehicles 16 are supposed to avoid, i.e. not drive in or through.

In one embodiment, after the keep-out-zone 14 is initially defined or established, the system 10 may be configured to increase size of the keep-out-zone 14 when an access-door 46 of a vehicle (e.g. the host-vehicle 12 or any other vehicle within the keep-out-zone 14) is opened to provide for additional space for the access-door 46 and additional space if occupants (not shown) exit the host-vehicle 12. To enable this feature, the system 10 may include a door-detector 48 (FIG. 1), such as a door-switch in the host-vehicle 12, or an image processor if detection equipment is a camera for example. The camera may be on-vehicle or remote, i.e. part of infrastructure, e.g. part of a traffic-monitoring-system. The controller 30 or the processor 32 is then configured to indicate a door-status 50 of the access-door 46 of the host-vehicle 12 based on a signal from the door-detector 48 or the camera, where the door-status 50 includes open and closed. The controller 30 or the processor 32 may be then configured to determine the boundaries 42 of the keep-out-zone 14 in accordance with the door-status 50. For example, the system 10 may temporarily increase the size of keep-out-zone 14 around host-vehicle 12 when a road-side driver-door or a road-side back-door (e.g. the access-door 46) is opened by adding an expanded-area 52 to the original extents of the keep-out-zone 14.

Alternatively, the system 10 may temporarily increase size of keep-out-zone 14 in a direction behind or in front of the host-vehicle 12 when back or trunk-lid or engine-hood of the host-vehicle 12 is opened. The system 10 may consider other factors when temporarily increasing the meets and bounds of the keep-out-zone. For example, if the host-vehicle 12 is stopped, in park, the access-door 46 is closed, and the opening mechanism of the access-door 46 is engaged but the access-door 46 is not yet opened, the size of keep-out-zone 14 may be increased in anticipation of the opening of the access-door 46.

The system 10 may also be configured to increase the size of keep-out-zone 14 when any person or object approaches any vehicle within the keep-out-zone 14, e.g. when a police-officer, emergency-medical-personnel, a construction worker, or construction equipment gets too close to an edge or the boundaries 42 of keep-out-zone 14. To this end, the system 10 may include a proximity-detector 54. The proximity-detector 54 may be formed of or include a camera, radar, lidar, ultrasonic-transducer, or any combination thereof, located at various positions on the host-vehicle 12 or the other-vehicles 16 (e.g. police-car or tow-truck), or as part of an infrastructure sensor, e.g. a traffic-monitoring-camera. The controller 30 or the processor 32 may be configured to indicate that an object 58 (person or equipment, see also FIG. 3) has approached (either from within or outside of the keep-out-zone 14) an edge 56 of the keep-out-zone 14. The controller 30 or the processor 32 is configured to adjust the boundaries 42 of the keep-out-zone 14 in accordance with a determination that the object has approached the edge of the keep-out-zone either from within or outside of the keep-out-zone 14. For example, the system 10 increases the size of the keep-out-zone 14 beside host-vehicle 12 when a person (the object 58 in FIG. 2) approaches the road-side driver-door or any door or trunk or hood.

The system 10 may also be configured to continuously adjust the boundaries 42 of the keep-out-zone 14 of a moving instance of the host-vehicle 12 such as an over-sized vehicle, e.g. construction/farm equipment with protrusions, or a towing-vehicle towing the host-vehicle 12. To this end, the location-detector 22 is configured to indicate a motion-vector 60, e.g. heading and speed of the host-vehicle 12. Accordingly, the controller 30 or the processor 32 is configured to adjust the boundaries 42 of the keep-out-zone 14 in accordance with the motion-vector 60. That is, the system 10 may continuously adjust and broadcast updates of the coordinates 44 of the boundaries 42 as host-vehicle 12 moves. It is expected that broadcasting internet map updates may be too slow with the current state of the art, but DSRC is expected to be sufficiently fast. As another application, an emergency vehicle could also transmit metadata with the coordinates 44 of the boundaries to indicate the type of the keep-out-zone 14.

It is contemplated that the keep-out-zone 14 may cover or include areas around other vehicles involved in an accident, an area around a tow-truck preparing to or in the process of towing another vehicle, moving emergency vehicles such as firetrucks or police in pursuit, street/gutter sweeping vehicles, garbage trucks, school buses, bucket trucks engaged in tree trimming, and public buses. It is also contemplated that one or more instances of the keep-out-zone 14 may have configurations of the boundaries 42 that create traffic funnel to guide or funnel vehicles into areas for parking, police checks, or toll booths. It is recognized that there would need to be some type of authentication/authorization to establish the keep-out-zone or merchants could use this to funnel everyone into their establishments.

The coordinates 44 of the boundaries 42, e.g. the coordinates 44 of end-points of straight or continuous curvature sections of the boundaries 42, are received by the other-vehicles 16 proximate to, e.g. within three-hundred meters (300 m) of the keep-out-zone 14. The information broadcast by the transmitter 20 may include data that specifies a shape (e.g. curved or straight) of the boundaries 42, or a shape of the keep-out-zone 14 (e.g. square, rectangle, circle, etc.). In one embodiment, the coordinate-system used to specific the coordinates 44 are world-coordinates (e.g. latitude, longitude, elevation), the details of which will be recognized by those in the art. Alternatively, the coordinates 44 may specify a relative position to one or more instances of reference-objects, where each reference-object has a known reference-coordinate.

Figure 3:
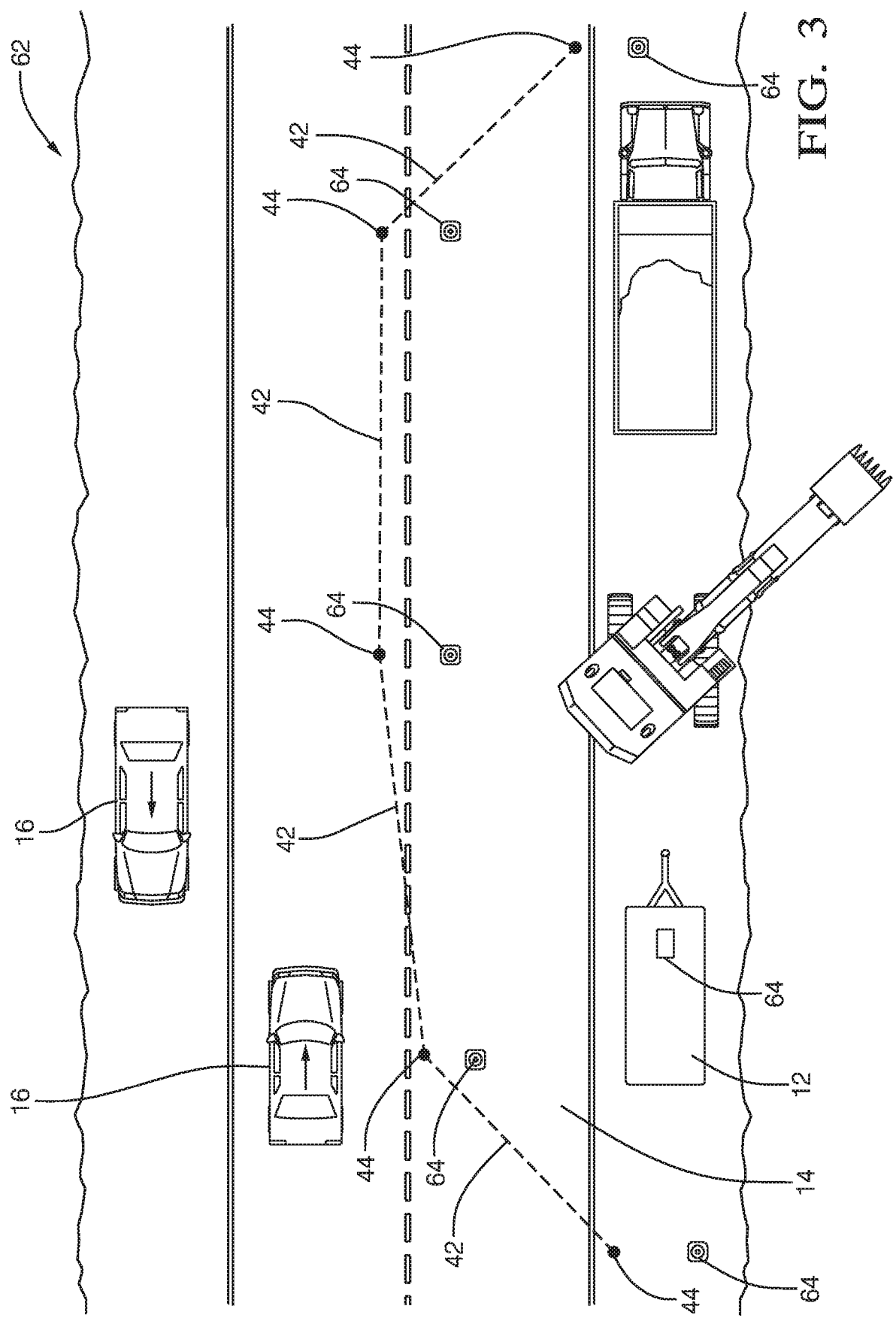
FIG. 3 is a second-scenario encountered by the system of FIG. 1 in accordance with one embodiment.

FIG. 3 illustrates a non-limiting example of a second-scenario 62, where the keep-out-zone 14 is established or defined at a construction site where, for example, an excavator and a dump-truck are operating. The description of the system 10 thus far describes how the coordinates 44 of the boundaries 42 of the keep-out-zone 14 are determined and broadcast without physically placing any objects that can be visually detected by the other-vehicles 16. In the examples below, the boundaries 42 of keep-out-zone 14 are defined by, or based on, or in accordance with, the placement of one or more instances of safety-markers 64, e.g. a physical object such as a road-cone, pylon, barricade, saw-horse, or electronic-flare. That is, in one embodiment the system 10 includes one or more safety-markers 64, and the controller 30 is configured to define the boundaries 42 of the keep-out-zone 14 in accordance with a position of each of the one or more safety-markers 64. In FIG. 3, multiple safety-markers define the perimeter of keep-out-zone 14. However, it is contemplated that the use of a single safety-marker can define the keep-out-zone 14. For example, the keep-out-zone 14 may extend laterally to right or left edge of road depending on relative-location of a single instance of the safety-markers 64, and extend longitudinally in the direction of traffic a predefined distance, e.g. 3 car-lengths or 30 meters. It is also contemplated that other shapes (other than rectangle) of the keep-out-zone 14 can be defined In one embodiment of the system 10, the transmitter 20 (e.g. the DSRC transceiver) is attached to a host-vehicle 12, which in FIG. 3 is an equipment trailer that may be used to transport the safety markers 64 to the construction site. The position of each of the one or more safety-markers 64 is determined with respect to (i.e. relative to) the location 26 of the transmitter 20. One options to establish the keep-out-zone 14 when the location-detector 22 and the transmitter 20 are in or on the host-vehicle 12 is to use the sensors 24 to measure the relative position of the safety-markers 64. If the safety markers are simple physical object without any electronic features, the system 10 may rely on a person to momentarily hold each of safety-markers 64 elevated over an intended position. This may be especially necessary if the intended position has a line-of-site between perception-sensor and safety-marker that is blocked by when the safety marker is placed on the ground. The person may have personal-transmitter (e.g. key-fob, RF, IR) that when activated indicates that the perception-sensor should note position of person or particular instance of safety-marker. Such configuration of the system would be advantageous for reasons of cost, but may require some operator skill.

Another option is for the controller 30 and transmitter 20 to be located in the host-vehicle 12, and each of the safety-markers is equipped with an individual instance of the location-detector 22. Then the location of each safety-marker can be communicated to controller which defines the keep-out-zone based on the locations of each of the safety-markers 64, operates the transmitter 20 accordingly. This configuration is advantageous because it can be fully automatic. I.e. just turn-on and place the safety-markers, and the system 10 determines the boundaries 42 without further human interaction.

In another configuration of the system 10, the transmitter 20 is attached to or part of one instance of the one or more safety-markers 64. I.e. the system 10 may have one master-safety-marker and optionally one or more drone or slave-safety-markers. Each instance of safety-markers 64 is equipped with location-device, and the location of each safety-marker communicated to the controller 30 which operates transmitter 20 to broadcast the coordinates 44 of the boundaries 42 of the keep-out-zone 14. This configuration is advantageous as the system 10 is not tied to an instance of the host-vehicle 12. That is, whatever vehicle transported the safety-markers 64 does not need remain nearby after the safety-markers 64 are place or deployed. In an even more flexible example of the system 10, all instances of safety-markers 64 are equipped with instances of the controller 30, transmitter 20, and the location-detector 22, but only one instance of the controller 30 is designated as master which operates corresponding instance of transmitter to broadcast the boundaries of the keep-out-zone 14.

The system may also include an interface-pad or keyboard that is used as a means to access information about the roadways and enables the keep out zone to build polynomials that reflect the shape of the road. Such an input means may be used to manually adjust or deactivate boundaries of the keep-out-zone 14. It is also contemplated that the keep-out-zone 14 may be defined with different safety-levels such warning area, danger area, absolutely do not enter area. Furthermore, a single instance of a keep-out-zone may have different section such as warning area, danger area, absolutely do not enter area. The broadcasting of the keep-out-zone 14 may also include metadata indicating which types of vehicles the keep-out-zone pertains to.

The boundaries 42 of the keep-out-zone 14 may be included or put in digital-map 66 that is accessible by an instance of the other-vehicles 16. That is, the transmitter may be configured to update the digital-map 66 in accordance with the boundaries 42 of the keep-out-zone 14, and the digital-map is available to the other-vehicles 16.

Figure 4:
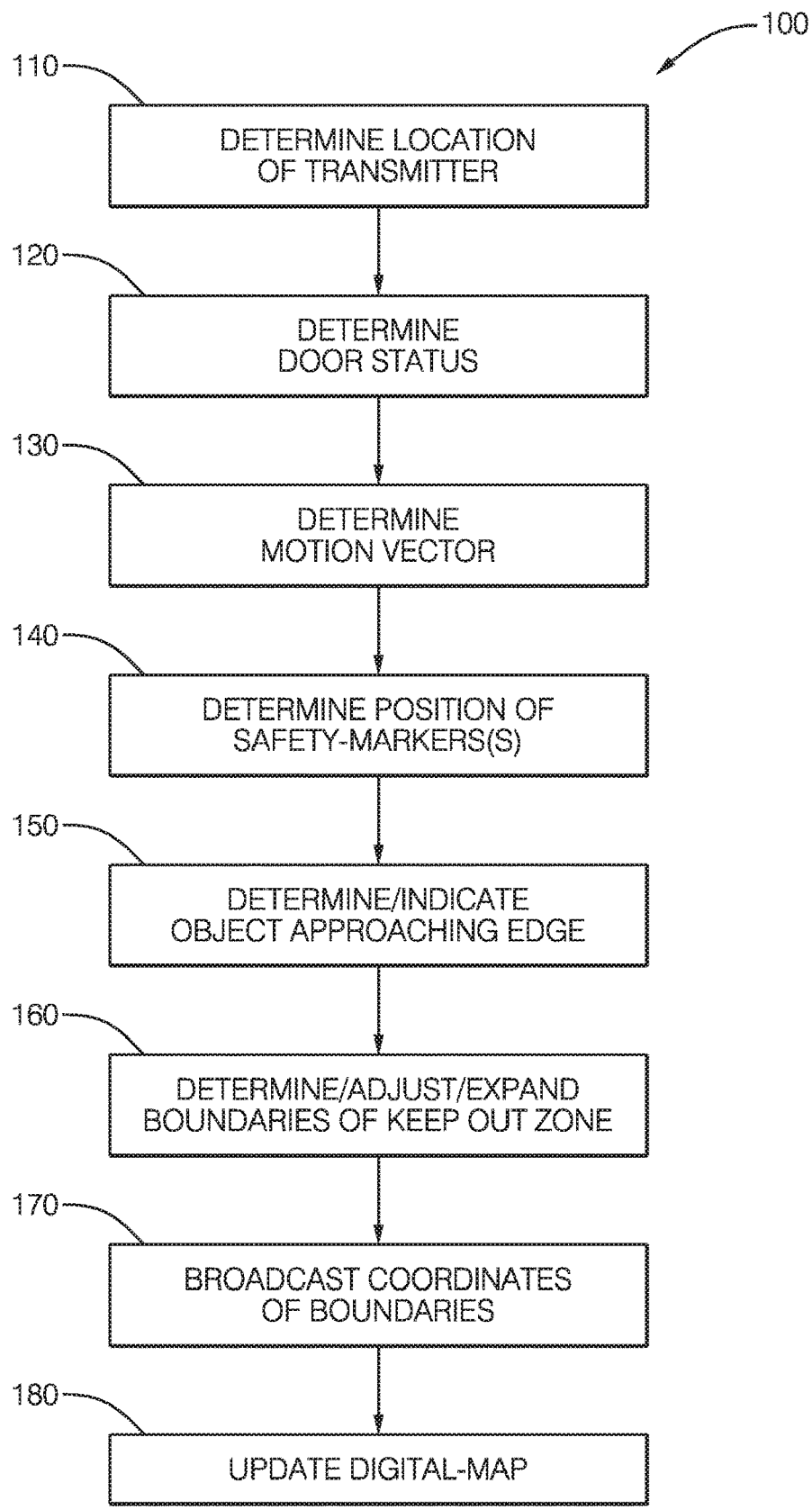
FIG. 4 is a flowchart of a method of operating the system of FIG. 1 in accordance with one embodiment.

FIG. 4 illustrates a flowchart of a non-limiting example of a method 100 of operating a virtual-barrier system (the system 10) that defines the keep-out-zone 14 (FIGS. 1-3) for vehicles to avoid.

Step 110, DETERMINE LOCATION OF TRANSMITTER, may include determining a location 26 of a transmitter 20 using a location-detector 22. The location 26 may be in terms of, but not limited to, latitude, longitude, and elevation. Depending on which of the configurations of the system 10 (see above for variations) is used, the location-detector 22 may not be co-located with the transmitter 20, so an offset-distance and an offset-direction may be needed to account for the separation.

Step 120, DETERMINE DOOR-STATUS, is an optional step may include determining a door-status 50 an access-door 46 of a host-vehicle 12 indicated by a door-detector 48; and determining the boundaries 42 of the keep-out-zone 14 in accordance with the door-status 50.

Step 130, DETERMINE MOTION-VECTOR, is an optional step that may include determining, with the location-detector 22, a motion-vector 60 (e.g. compass-heading and speed) of a host-vehicle 12. Multiple readings from the sensors 24 and/or the location-detector 22 may be gathered over a time-interval, and any differences or changes in those reading can be used to determine the motion-vector 60. If the location-detector 22 is moving, indicating that for example the host-vehicle 12 is moving, then the keep-out-zone 14 can be updated as needed. Having the keep-out-zone 14 move with the host-vehicle 12 may be advantageous when, for example, the host-vehicle 12 is being towed, or the host-vehicle 12 is towing an over-sized trailer or object.

Step 140, DETERMINE POSITION OF SAFETY-MARKER(S), is an optional step that may include determining the position of each of the one or more safety-markers 64 with respect to the location 26 of the transmitter 20 if instances of the safety-markers are placed. In some configurations of the system 10 there are no visible safety-markers placed, so the boundaries 42 of the keep-out-zone 14 are invisible to a human.

Step 150, DETECT/INDICATE OBJECT APPROACHING EDGE, is an optional step that may include indicating that a proximity-detector 54 detected an object 58 approaching an edge 56 of the keep-out-zone 14. For example, if a human such as a police-officer, emergency medical technician, or a construction worker approaches the edge 56 of the keep-out-zone, it may be preferable to change the boundaries to better protect that person.

Step 160, DETERMINE/ADJUST/EXPAND BOUNDARIES OF KEEP-OUT-ZONE, may include initially determining the boundaries 42 of the keep-out-zone 14 in accordance with the location 26. This initial or baseline determination of the boundaries 42 may then be revised or expanded when there is a determination that the object 58 (e.g. human, construction equipment) is approaching the edge 56 of the keep-out-zone 14 either from within the keep-out-zone 14 from outside of the keep-out-zone 14. If the location-detector 22 indicates or the controller determines that the host-vehicle 12 is moving, i.e. exhibits a motion-vector 60, step 160 may include adjusting the boundaries of the keep-out-zone 14 in accordance with the motion-vector 60. Alternatively, if one or more safety markers 64 have been placed or deployed, step 160 may include defining the boundaries 42 of the keep-out-zone 14 in accordance with a position of each of one or more safety-markers 64.

Step 170, BROADCAST COORDINATES OF BOUNDARIES, includes broadcasting the coordinates 44 of the boundaries 42 of the keep-out-zone 14 using the transmitter 20. The coordinates 44 may be determined based on, for example, the positioning of safety-markers 64 and/or an invisible boundary around the host-vehicle 12.

Step 180, UPDATE DIGITAL-MAP, is an optional step that includes updating the digital-map 66 in accordance with coordinates 44 and/or the boundaries 42 of the keep-out-zone 14. The digital-map 66 is preferably stored remote from the host-vehicle 12, e.g. in the cloud, so that the other-vehicles 16 can access the digital-map 66 for path-planning of a vehicle.

The above description may be characterized as being directed to a first-device 30 that includes one or more instances of the processor 32, and the memory 34. The first-device includes one or more programs stored in memory 34, the one or more programs including instructions for performing the all or part of the method 100 described above.

Alternatively, the above description may be characterized as being directed to a non-transitory computer-readable storage medium 34 comprising one or more programs for execution by one or more instance of the processor 32 of the first-device 30, the one or more programs including instructions which, when executed by the one or more processors, cause the first-device 30 to perform all or part of the method 100.

Accordingly, a virtual-barrier system (the system 10), a controller 30 for the system 10, and a method 100 of operating the system 10 are provided. The virtual-barrier defines a keep-out-zone 14 that may be visible or invisible to a human. The boundaries 42 of keep-out-zone 14 may align with instances of safety-markers 64, or may be offset from the safety-markers 64 to assure clearance between the safety-markers 64 and the other-vehicles 16.

While this invention has been described in terms of the preferred embodiments thereof, it is not intended to be so limited, but rather only to the extent set forth in the claims that follow.

We claim:

1. A method comprising:
   determining a position of one or more safety-markers;
   determining a location of a host vehicle;
   defining boundaries of an area of a keep-out-zone in accordance with the position of the one or more safety-markers and in accordance with the location of the host vehicle relative to the position of the one or more safety-markers, the keep-out-zone defining an area where automated vehicles are to avoid operating; and
   broadcasting data based on the boundaries of the keep-out-zone.

2. The method of claim 1, wherein the broadcasted data defining the boundaries of the keep-out-zone is used to steer an automated vehicle around the keep-out-zone, change a previously planned route of an automated vehicle, or stop an automated vehicle.

3. The method of claim 1, wherein defining the boundaries of the area of the keep-out-zone includes determining coordinates of end-points of sections of the boundaries based on the position of the one or more safety-markers, and wherein the broadcasted data includes data that specifies a shape of the boundaries.

4. The method of claim 1, further comprising:
   defining a safety-level associated with the keep-out-zone from a plurality of safety-levels, wherein the broadcasted data defining the keep-out-zone indicates the safety-level of the keep-out-zone.

5. The method of claim 1, wherein determining the position of the one or more safety-markers includes receiving the position of the one or more safety-markers from the one or more safety-markers, wherein defining the boundaries of the area of the keep-out-zone is based on the received position of the one or more safety-markers.

6. The method of claim 1, wherein determining the position of the one or more safety-markers, defining the boundaries of the area of the keep-out-zone, and broadcasting data defining the boundaries of the keep-out-zone are performed at one of the one or more safety-markers.

7. The method of claim 1, wherein determining the position of the one or more safety-markers, defining the boundaries of the area of the keep-out-zone, and broadcasting data defining the boundaries of the keep-out-zone are performed at a host vehicle.

8. The method of claim 1, wherein determining the position of the one or more safety-markers includes using a sensor on a host vehicle to measure the position of the one or more safety-markers.

9. The method of claim 1, wherein defining the boundaries of the area of the keep-out-zone is based on an edge of a road or a direction of traffic and the position of the one or more safety-markers.

10. The method of claim 1, further comprising:
    updating a digital-map in accordance with the boundaries of the keep-out-zone, wherein the digital-map is accessible to automated vehicles for planning a path for the automated vehicles, wherein the digital-map is stored on a network and is accessible to the automated vehicles via an internet connection.

11. The method of claim 1, wherein defining the boundaries of the area of the keep-out-zone in accordance with the position of the one or more safety-markers is performed without human interaction.

12. The method of claim 1, wherein defining the boundaries of the area of the keep-out-zone is based on manual input.

13. The method of claim 1, wherein one or more of the safety-markers is a physical object.

14. A system comprising:
    one or more safety-markers;
    one or more location-detectors configured to determine a position of the one or more safety-markers and a location of a host vehicle;
    a controller-circuit in communication with one or more of the location-detectors, the controller-circuit configured to define boundaries of an area of a keep-out-zone in accordance with the position of the one or more safety-markers and in accordance with the location of the host vehicle relative to the position of the one or more safety-markers, the keep-out-zone defining an area where automated vehicles are to avoid operating; and a transmitter in communication with the controller, the transmitter configured to broadcast data based on the boundaries of the keep-out-zone.

15. A non-transitory computer-readable storage medium comprising one or more programs for execution by one or more processors, the one or more programs including instructions for:

determining a position of one or more safety-markers;

determining a location of a host vehicle;

defining boundaries of an area of a keep-out-zone in accordance with the position of the one or more safety-markers and in accordance with the location of the host vehicle relative to the position of the one or more safety-markers, the keep-out-zone defining an area where automated vehicles are to avoid operating; and broadcasting data based on the boundaries of the keep-out-zone.

\* \* \* \* \*